United States Patent
Ren et al.

(10) Patent No.: US 9,798,562 B2
(45) Date of Patent: Oct. 24, 2017

(54) FACILITATION OF GUEST APPLICATION DISPLAY FROM HOST OPERATING SYSTEM

(71) Applicant: Intel Corporation, Santa Clara, CA (US)

(72) Inventors: Jinkui Ren, Shanghai (CN); Dongxiao Xu, Shanghai (CN); Xiantao Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 14/778,525

(22) PCT Filed: Sep. 26, 2014

(86) PCT No.: PCT/CN2014/087490
§ 371 (c)(1),
(2) Date: Sep. 18, 2015

(87) PCT Pub. No.: WO2016/045070
PCT Pub. Date: Mar. 31, 2016

(65) Prior Publication Data
US 2016/0291995 A1  Oct. 6, 2016

(51) Int. Cl.
*G06F 9/455* (2006.01)
*G06F 9/50* (2006.01)

(52) U.S. Cl.
CPC ...... *G06F 9/45541* (2013.01); *G06F 9/45537* (2013.01); *G06F 9/5016* (2013.01)

(58) Field of Classification Search
CPC . G06F 9/45541; G06F 9/45537; G06F 9/5016
See application file for complete search history.

(56) References Cited

U.S. PATENT DOCUMENTS

| 8,117,554 B1 * | 2/2012 | Grechishkin | G06F 9/4443 703/23 |
| 2013/0007203 A1 | 1/2013 | Szu | |
| 2015/0277861 A1 * | 10/2015 | Jennings | G06F 8/41 717/148 |

FOREIGN PATENT DOCUMENTS

| CN | 101490648 A | 7/2009 |
| CN | 101667123 A | 3/2010 |
| CN | 103327117 A | 9/2013 |

OTHER PUBLICATIONS

International Search Report and Written Opinion dated Jun. 12, 2015 for International Application No. PCT/CN2014/087490, 8pages.

\* cited by examiner

*Primary Examiner* — James J Lee
(74) *Attorney, Agent, or Firm* — Schwabe, Williamson & Wyatt, P.C.

(57) ABSTRACT

Apparatuses, methods, and computer-readable media for buffer provision application ("BFA") are described. The BPA may facilitate display of a guest application executing in a host operating system ("host OS"). The host OS may provide for execution of a guest application, such as through use of an emulator configured to emulate a guest OS environment. The BFA may provide a drawing buffer for use by the guest application. The drawing buffer may be caused to be allocated within the host OS by the BFA. The BFA may then cause the allocated buffer to be provided to the guest application so that the guest application may draw frame data directly to the drawing buffer. The BFA may then facilitate access to the drawing buffer by the host OS when compositing drawing buffer data with other drawing data of the host OS. Other embodiments may be described and claimed.

19 Claims, 8 Drawing Sheets

FACILITATION OF GUEST APPLICATION DISPLAY FROM HOST OPERATING SYSTEM

CROSS REFERENCE TO RELATED APPLICATIONS

The present application is a national phase entry under 35 U.S.C. §371 of International Application No. PCT/CN2014/087490, filed Sep. 26, 2014, entitled "FACILITATION OF GUEST APPLICATION DISPLAY FROM HOST OPERATING SYSTEM", which designated, among the various States, the United States of America. The Specification of the PCT/CN2014/087490 Application is hereby fully incorporated by reference.

TECHNICAL FIELD

The present disclosure relates to the field of data processing, in particular, to apparatuses, methods and storage media associated with facilitating display of guest applications in a host operating system.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many computing device environments, for example, mobile devices, offer the ability to execute applications. In many devices, the device runs a particular operating system ("OS") and execution environment and allows execution of applications that are made for that OS and environment. However, in some scenarios, users of these devices may wish to execute applications that were developed to execute in different environments and/or under differed OSes. For example, a user of a mobile phone executing under a version of the Android® OS may, in some circumstances, wish to execute a guest application that was not originally written to operate on an Android device, such as a Windows® application.

These guest applications may, in some scenarios, be executed within an emulator that allows the guest application to execute as if it were executing in its expected OS and environment. However, there may be difficulties experienced when attempting to allow the guest application to draw to a screen of the computing device. In various scenarios, because the guest application is not running under the host OS of the computing device, the computing device may find it difficult to obtain access to screen produced by the guest application in order to draw them on the device.

In some techniques, a memory copy scheme is used to get past these limitations. In many situations, the host OS may utilize two buffers, a front buffer and a back buffer, allow drawing of guest application frames on the back buffer, and switch between the two when the drawing of each frame is complete. However, the host OS may not know when drawing of a frame is complete, because the guest application is performing its drawing within an emulated environment (and does not necessarily know that the host operating system is waiting for a completed frame). Thus, the host OS may, in some scenarios, periodically poll the guest application to determine when a frame is complete. Upon such indication, the host OS may then perform a copy of the guest application's local drawing buffer to the host OS's back buffer, and then perform a buffer switch to allow the guest-application-drawn frame to appear on the screen of the computing device. However, while this technique may provide for the guest application to draw to the computing device screen, the polling and copying of drawing buffer memory introduce substantial processing costs that are undesirable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
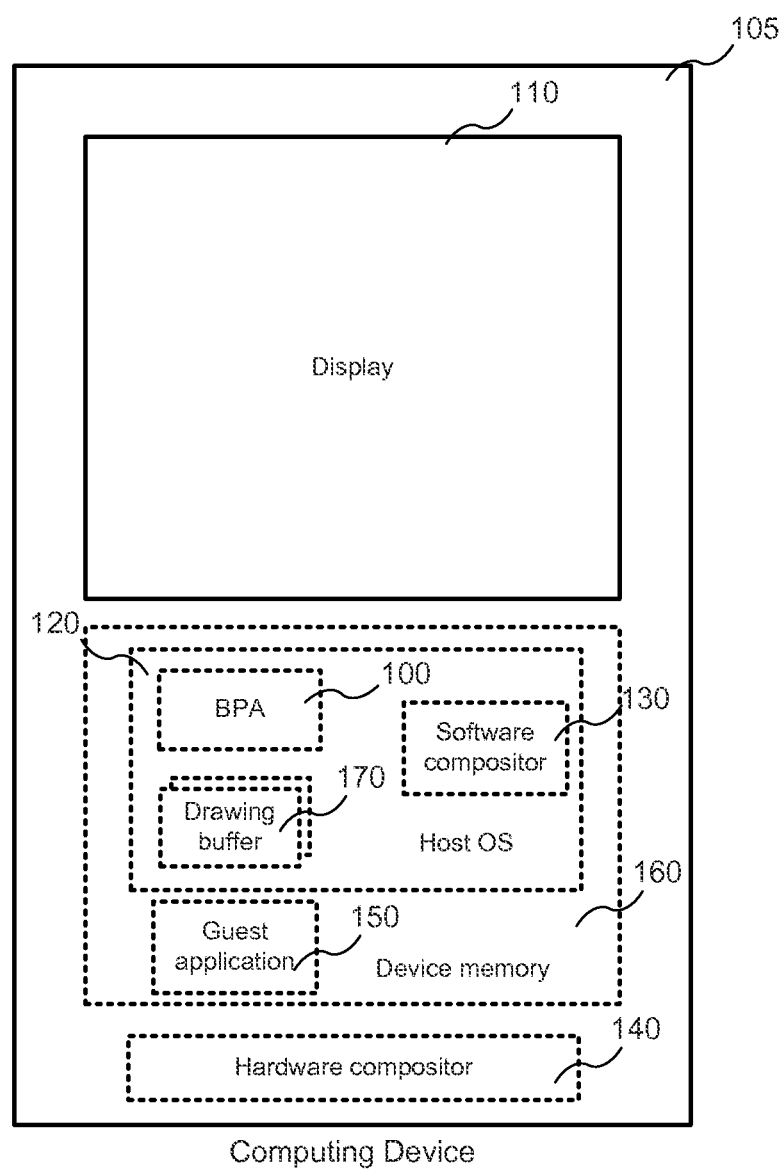
FIG. 1 illustrates an example arrangement for a computing device configured to facilitate display of guest applications in a host OS in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a buffer provision application ("BFA") may be configured to facilitate display of a guest application executing in a host operating system ("host OS"). In various embodiments, a host operating system may operate on a computing device and allow for the execution of applications. In various embodiments, a guest application may be configured to execute in a guest operating system ("guest OS") other than the host OS. The host OS may provide for execution of the guest application, such as through use of an emulator configured to emulate a guest OS environment for the guest application. In various embodiments, the BFA may be configured to provide a drawing buffer for use by the guest application. The drawing buffer may, in various embodiments, be caused to be allocated within the host OS by the BFA (or by a helper application of the BFA). The BFA may then cause the allocated buffer to be provided to the guest application so that the guest application may draw frame data directly to the drawing buffer. Because the drawing buffer was allocated to be available and known to the BFA, however, the BFA may then facilitate access to the drawing buffer by the host OS when compositing drawing buffer data with other drawing data of the host OS. In various embodiments, by performing this allocation and provision of the drawing buffer, a need for the overhead issues discussed above may be reduced. In particular, the BFA may reduce a need for polling of the guest application to determine when frames are drawn and/or copying of frame data from a drawing buffer of the guest application. Particular non-limiting embodiments and implementation examples are provided below.

Referring now to FIG. 1, an example arrangement for a computing device 105 configured to facilitate display of a guest application 150 in accordance with various embodiments. In various embodiments, the computing device 105 may include various types of computing device, including, but not limited to, mobile devices, mobile phones, laptop computers, desktop computers, embedded systems, etc. The computing device 105 may include device memory 160, which may include various types of removable or permanent memory (or storage) as may be understood. A host OS 120 may execute from within the device memory 160. The host OS 120 may, in some embodiments, be a version of the Android™ operating system, but in various embodiments, may include, but is not limited to, other operating systems configured to operate on mobile or non-mobile computing devices, such as iOS™, Windows™, Fire OS™, and other OSes. In various embodiments, the host OS 120 may be configured to support execution of one or more applications, such as a buffer provision application 150 ("BPA 150"), which may be configured to facilitate display of guest application 150 in the host OS 120, as described herein. The host OS 120 may also be configured to support execution of a software compositor application 130 ("SWC 130") which may be configured to perform composition of drawing data, as described herein. Particular activities of the BPA 150 and SWC 130 are described below.

The computing device 105 may also include a guest application 150. In various embodiments, the guest application 150 may be configured to execute on a different operating system than the host OS 120. For example, in some embodiments, the guest application 150 may be an application configured to execute in a Windows™ operating system. Additionally, in various embodiments, the computing device 105 may include hardware logic for performing one or more techniques described herein. In particular, the host OS 20 may include a hardware compositor 140 ("HWC 140") which may be configured to perform composition of drawing data, as described herein. It may be noted that, while particular features are illustrated in the examples herein as being performed by hardware and/or software, these are merely provided as examples and should not necessarily be read as requiring any particular locus for embodiments described herein.

Figure 2:
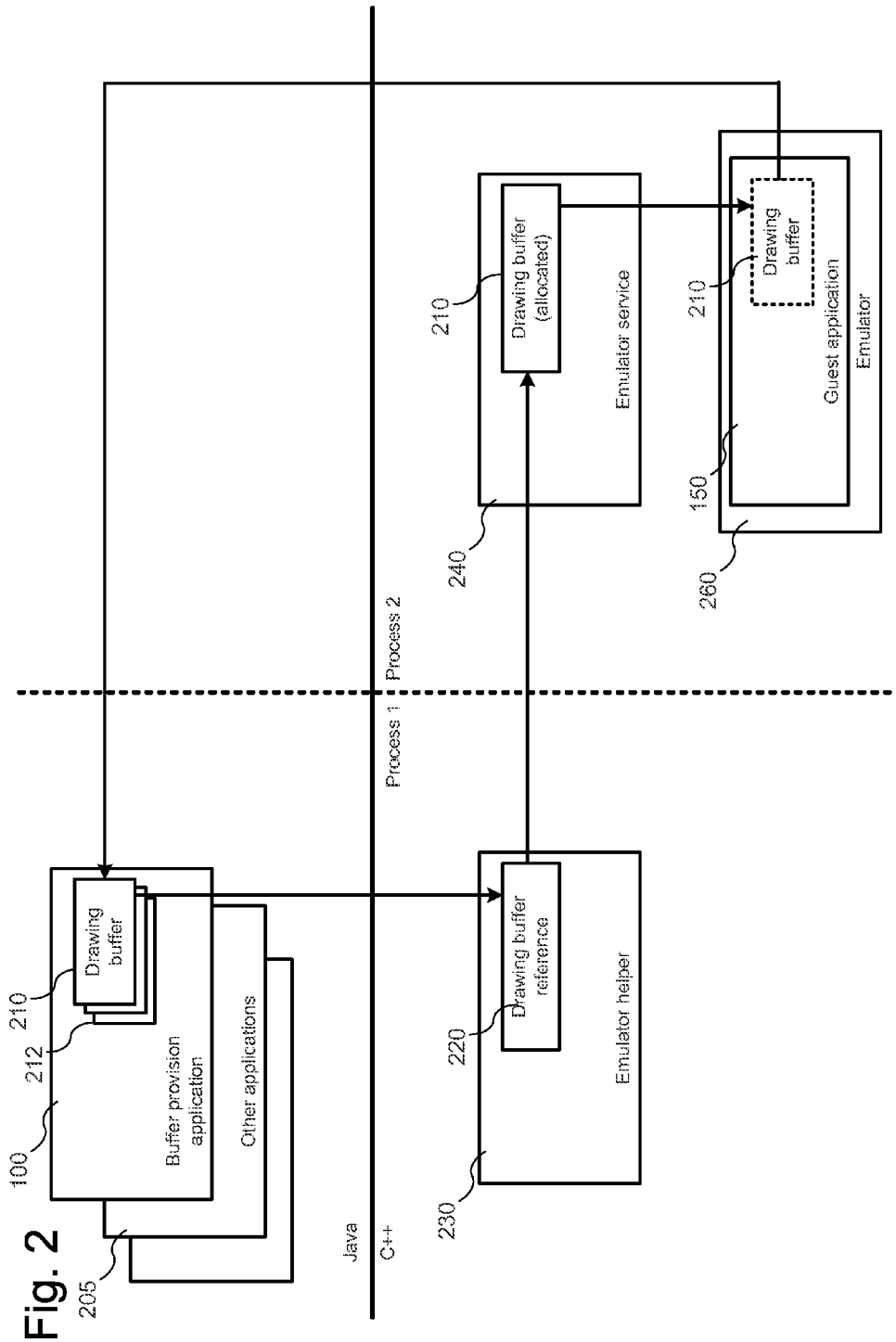
FIG. 2 illustrates an example arrangement for a buffer provision application facilitating display of guest applications in the host OS in accordance with various embodiments.

Referring now to FIG. 2, an example arrangement for the BPA 100 facilitating display of guest applications in the host OS 120 is illustrated in accordance with various embodiments. In various embodiments, the BPA 100 may be configured to operate alongside other applications 105, on the computing device 105. In some embodiments, the guest application 150 and the BPA 100 may be implemented in different programming languages. For example, in the example illustrated in FIG. 1, the host OS may be the Android™ OS with the BPA 100 implemented in Java™, while the guest application may be a Windows™ application implemented in C++. In other implementations, different programming languages may be utilized while incorporating aspects of embodiments described herein; further, in some embodiments, the BPA 100 and guest application 150 may be implemented, in whole or in part, utilizing the same programming language. The particular OS and programming language examples described herein with reference to FIG. 1 are therefore provided as such, as examples, and no particular implementation is thus intended.

In various embodiments, the BPA 100 may be configured to execute in a different process that the guest application 150, as illustrated. In various embodiments, while the term "process" is utilized herein, such usage may include various techniques for operation of separate applications executing on a computing device, including, but not limited to, separate processes, threads, methods, operation on separate processors, operation on separate processor cores, etc. Additionally, in various embodiments, the guest application 150 and BPA 100 may execute, in whole or in part, on a common thread or process. In various embodiments, such as illustrated in FIG. 1, the guest application 150 may execute on the computing device as facilitated by an emulator 260. The emulator 260 may, in various embodiments, be configured to provide the guest application 150 with an environment in which to execute that appears to the guest application 150 to be a guest OS (other than the host OS 120) in which the guest application is configured to execute, as may be understood. In various embodiments, the emulator 260 may be configured interoperate with host OS 120 applications through the use of an emulator service 240, which may include an application or other code that may be configured to execute in the same process as the guest application 150. In some embodiments, the emulator service 240 may be configured to allocate memory out of the device memory 160 within the host OS 120 for use by the emulator 260. In some embodiments, the emulator 160 may provide this memory to the guest application 150 for the guest application 150 to use as if it were guest OS memory. In various embodiments, other memory allocation methods may be utilized to provide memory for usage by the guest application 150, as may be understood. Additionally, in various embodiments, the BPA 100 may be configured to interoperate with a emulator helper 230, which may include an application or other code that may be configured to bind to the emulator service 240 to allow for the provision of data or other information to the emulator 260.

In various embodiments, the guest application 150 may be configured to draw one or more graphical frames of frame data to a drawing buffer in order to provide a graphical interface to a user of the computing device 105. In various embodiments the BPA 100 may be configured to cause allocation of a drawing buffer 210 and to provide that drawing buffer 210 to the guest application 150 for drawing of frame data. In various embodiments, the BPA 100 may be configured to create a drawing buffer 210 that is local to the BPA 100. In some embodiments, this drawing buffer 210 may be unallocated at the time of creation by the BPA 100. In some such embodiments, the BPA 100 may create the drawing buffer 210 as a drawing buffer reference 220, which may later be allocated in device memory 160, such as described herein. In various embodiments, the BPA 100 may be configured to create the drawing buffer 210 within a queue of drawing buffers 212, as may be understood. The BPA 100 may be configured to dequeue the drawing buffer 210 after creation (as well as prior to allocation) so that it may not be utilized by the BPA 100 or other processes of the host OS 120 for display to any display of the computing device 105.

In various embodiments, the BPA 100 may cause allocation of the drawing buffer 210 by sending the drawing buffer reference 220 to the emulator helper 230, which may be executing in the same process as the BPA 100. The emulator helper 230 may, in turn, send the drawing buffer reference 220 to the emulator service 240, which may be configured to allocate memory to the drawing buffer 210, as illustrated. The emulator service 240 may be configured in turn, to provide the now-allocated drawing buffer 210 to the guest application 150. For example if the guest application 150 is a Windows™ application, the drawing buffer 210 may be provided to the guest application 150 as a standard video graphics array ("VGA") buffer, as may be understood. For the purposes of clearer illustration, the drawing buffer 210 is illustrated in the guest application 150 with a dotted line, to illustrate that while the drawing buffer 210 is perceived as a local buffer by the guest application 150, the drawing buffer was created by and is directly accessible to, the BPA 100.

At the time of provision of the drawing buffer 210 to the guest application 150, the guest application 150 may proceed with drawing frame data to the drawing buffer 210. This frame data may then be accessible to the BPA 100, and thus to other processes of the host OS 120 on the computing device 105. Thus, the BPA 100 may be configured to enqueue the (now allocated) drawing buffer 210. In various embodiments, this enqueued buffer, which appears to the computing device as a host OS 120 application drawing buffer, may then be used by the host OS to display frame data from the guest application 150.

Figure 3:
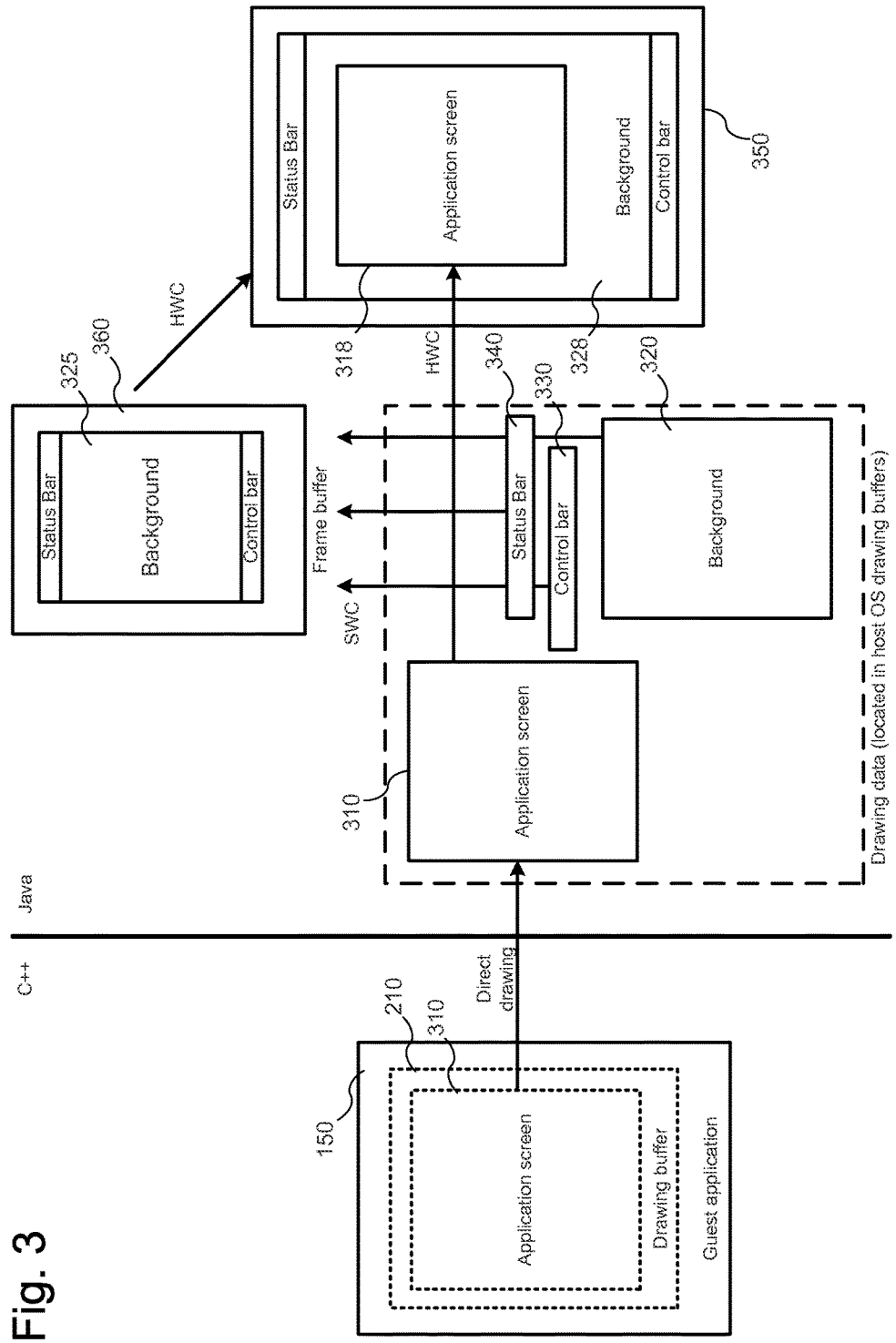
FIG. 3 illustrates an example illustration of drawing buffer composition, in accordance with various embodiments.

FIG. 3 illustrates an example illustration of drawing data composition, in accordance with various embodiments. In various embodiments, the techniques illustrated in FIG. 3 may be utilized to combine frame data from an application, and in particular the guest application 150, with other frame data, such as host OS 120 drawing data. Thus, as illustrated in FIG. 3, the guest application 150 may draw to the drawing buffer 210 (again, illustrated with a dotted line) in order to draw an application screen 310 associated with the guest application 150. This application screen 310 may thus be drawn to a drawing buffer available to the host OS 120, as discussed above. Additionally, the host OS 120 may additionally have access to various OS-associated drawing data, such as a status bar 340, a control bar 330, and a background 320. In various embodiments the host OS 120 may utilize this drawing data to display host OS 120 user interface elements and functionality. As FIG. 3 illustrates, through the use of the BPA 100, the application screen 310 of the guest application 150 may be available just as drawing data of the host OS 120 is, and thus the application screen 310 may be composited with the host OS drawing data.

In various embodiments, various techniques may be utilized for compositing the application screen 310 of the guest application 150 with the drawing data of the host OS 120. In some embodiments, these techniques may include drawing data composition techniques utilized in various implementations of Android™ OSes. In various embodiments, the host OS 120 may utilize the SWC 130 to composite the host OS 120 drawing data, including the status bar 340, control bar 330, and background 320, into a frame buffer 3260, where they may exist as screen data 325. Next, using the HWC 140, the computing device 105, under control of the host OS 120, may copy the screen data 325 (as a copy 328) to a display buffer 350, from which the display 110 may directly render a screen. The computing device 105 may also directly composite the application screen 315 from the drawing buffer 210 as a copy 318 over the copy of the screen data 318. In various embodiments, by providing the application screen 310 for direct, hardware-based composition with host OS screen data 325, the BPA 100 may provide for faster and more efficient provisioning of the application screen to the display buffer 350, and thus to the display 110 of the computing device 105.

Figure 4:
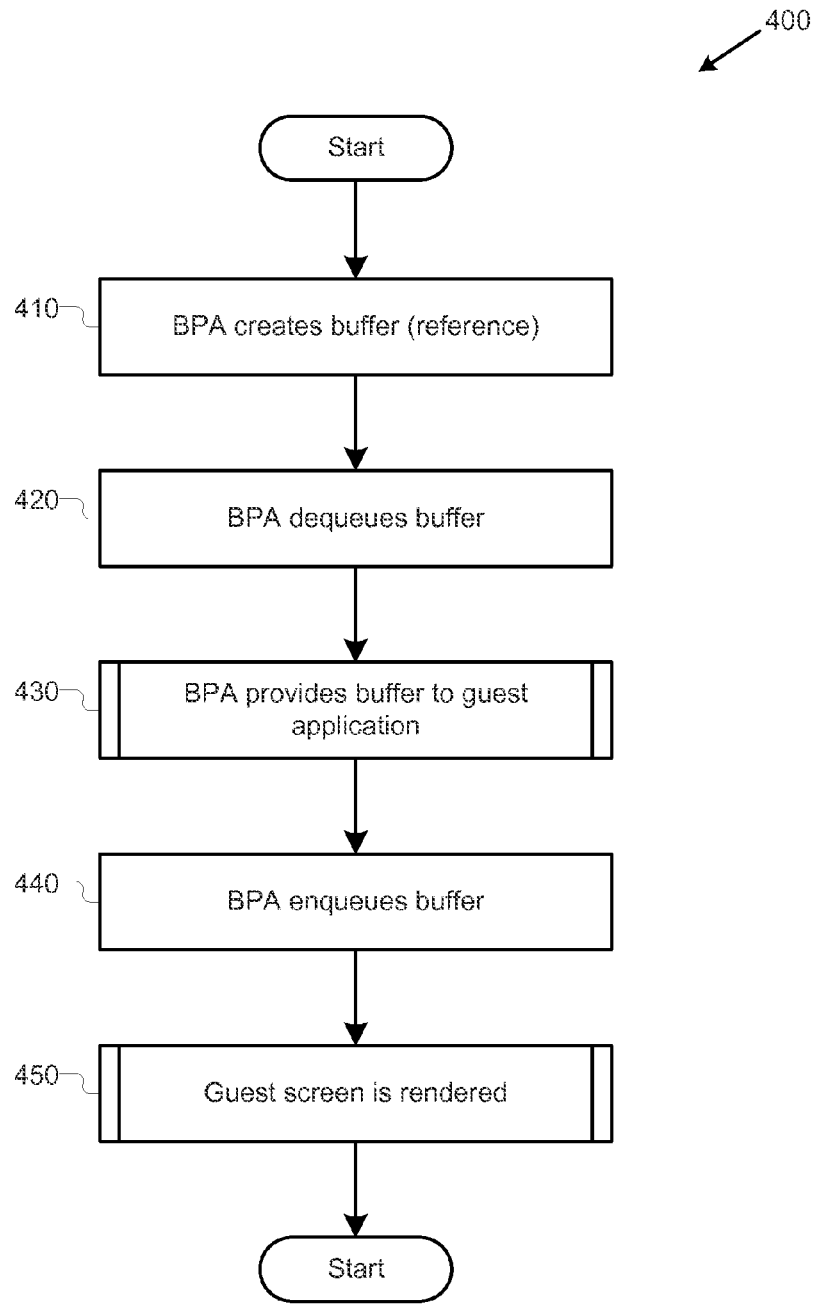
FIG. 4 illustrates an example process for a buffer provision application facilitating display of guest applications in a host OS in accordance with various embodiments.

FIG. 4 illustrates an example process 400 for a buffer provision application facilitating display of guest applications in a host OS in accordance with various embodiments. While FIG. 4 illustrates particular operations in a particular order, in various embodiments the operations may be combined, split into parts, and/or omitted. In various embodiments, operations of process 400 (as well as sub-processes) may be performed by one or more of the BPA 100, SWC 130, and/or HWC 140. In other embodiments, operations may be performed by different entities than those illustrated. The process may begin at operation 410, where the BPA 100 may create a drawing buffer 210. In various embodiments, the created drawing buffer 210 may include only a drawing buffer reference 220 at the time of creation, while in other embodiments the created drawing buffer 210 may be allocated by the BPA 100 at the time of creation. Next, at operation 420, the BPA 100 may dequeue the drawing buffer 210 from the drawing buffer queue 212.

At operation 430, the BPA 100 may provide the buffer to the guest application 150, in order that the guest application 150 may utilize the drawing buffer 210 for drawing frame data. Particular embodiments of operation 430 are described below with reference to process 500 of FIG. 5. Next, at operation 440, the BPA 100 may enqueue the drawing buffer which may have been allocated during operation 430 if it was not allocated prior. Next, at operation 450, the guest application 150 may cause its frame data to be rendered so that its application screen 310 may be rendered. Particular embodiments of operation 450 are described below with reference to process 600 of FIG. 6. The process may then end.

Figure 5:
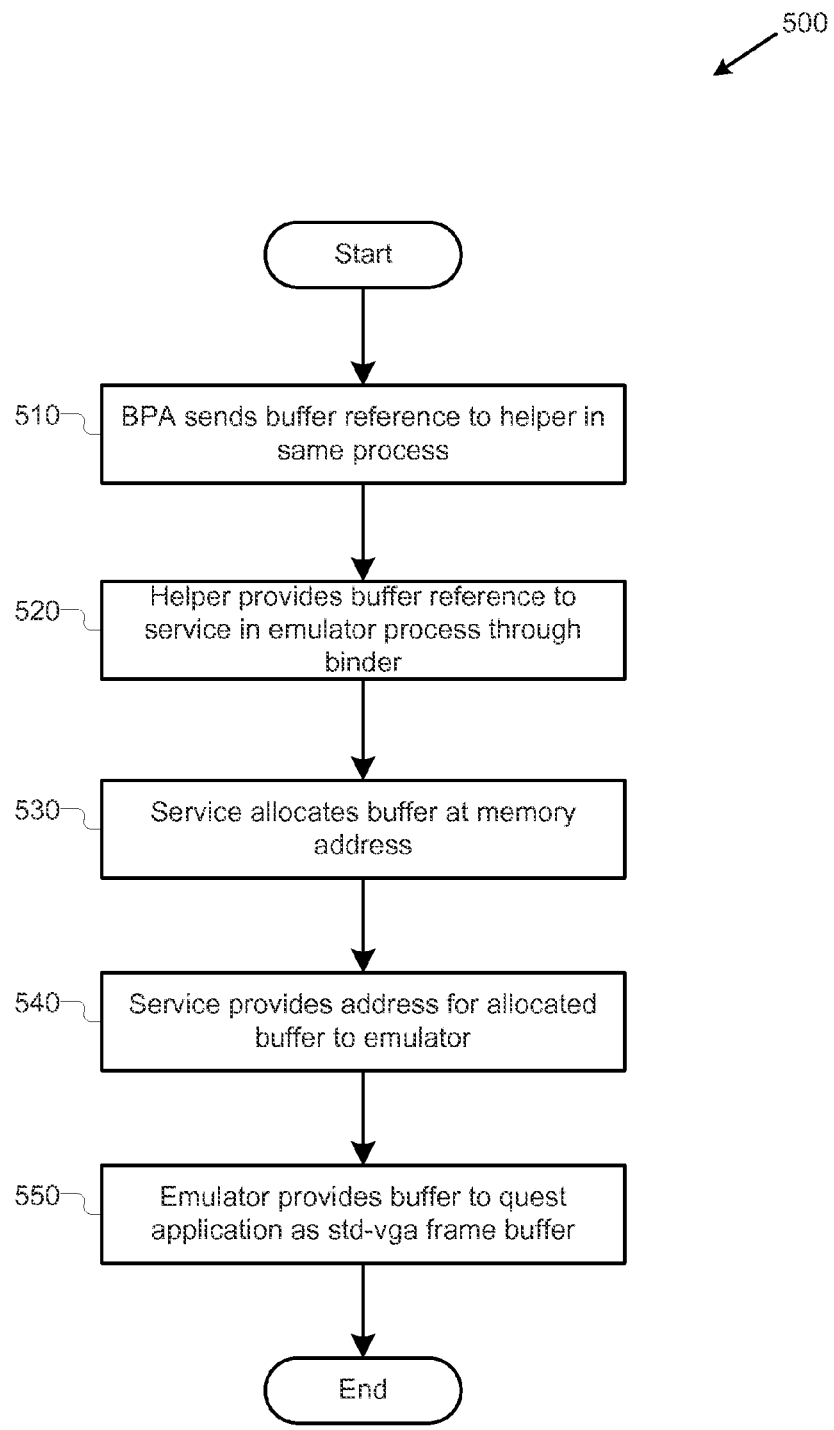
FIG. 5 illustrates an example process for the buffer provision application providing a buffer to a guest application in accordance with various embodiments.

FIG. 5 illustrates an example process 500 for the buffer provision application 100 to provide a drawing buffer 210 to the guest application 150 in accordance with various embodiments. While FIG. 5 illustrates particular operations in a particular order, in various embodiments the operations may be combined, split into parts, and/or omitted. In various embodiments, operations of process 500 (as well as sub-processes) may be performed by one or more of the BPA 100, emulator helper 230, emulator service 240, and/or emulator 260. In other embodiments, operations may be performed by different entities than those illustrated.

The process may begin at operation 510, where the BPA 100 may send the drawing buffer reference 220 to the emulator helper 230 which may be executing in the same process as the BPA 100. In various embodiments, the drawing buffer 210 that is referred to by the drawing buffer reference 220 may or may not be allocated during performance of operation 510. Next, at operation 520, the emulator helper 230 may provide the drawing buffer reference 220 to the emulator service 240, which may be executing in a different process than the emulator helper 230 and BPA 100. In various embodiments, the emulator helper 230 may send the drawing buffer reference 220 to the emulator service 240 through a binding, as may be understood.

Next, at operation 530, the emulator service 240 may allocate the drawing buffer 210 in device memory 160 at a particular memory address. In various embodiments, various known techniques may be utilized for performing this allocation, as may be understood. In embodiments where the BPA 100 (or other entity) previously allocated the drawing buffer 210, no allocation may be performed at operation 530. Next, at operation 540, the emulator service 240 may provide the address for the allocated buffer to the emulator 260. The emulator 260 may then, in turn, provide the allocated buffer to the guest application as a standard VGA frame buffer, through which the guest application 150 may draw frame data. The process may then end.

Figure 6:
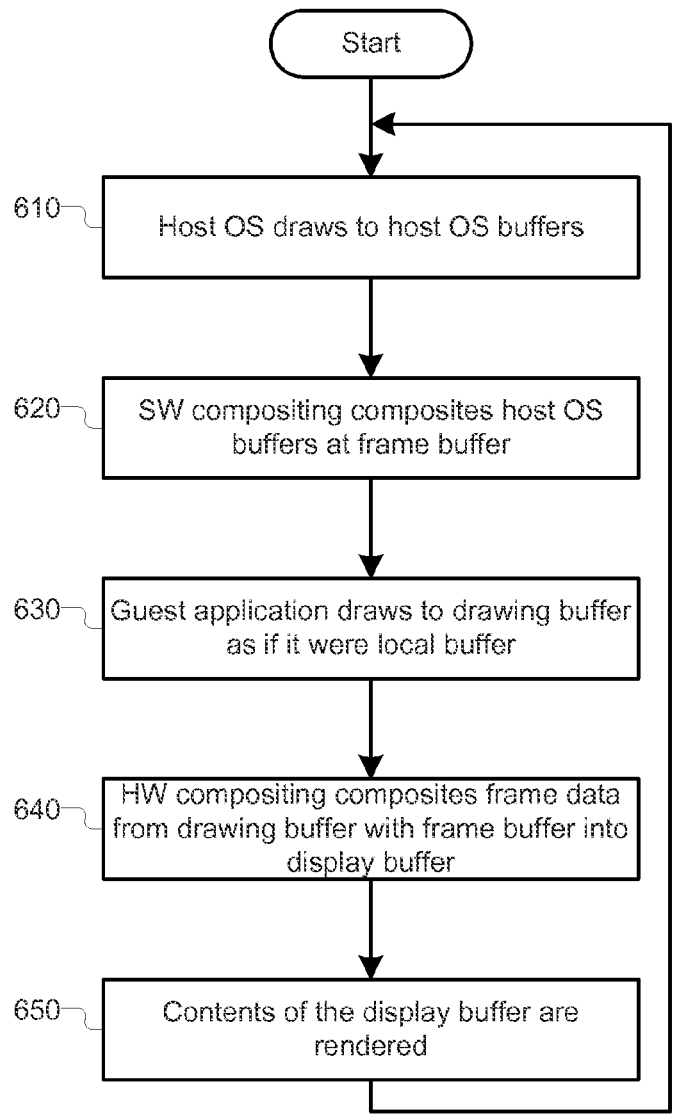
FIG. 6 illustrates an example process for a guest screen to be rendered in accordance with various embodiments.

FIG. 6 illustrates an example process 600 for a guest screen to be rendered in accordance with various embodiments. While FIG. 6 illustrates particular operations in a particular order, in various embodiments the operations may be combined, split into parts, and/or omitted. In various embodiments, operations of process 600 (as well as sub-processes) may be performed by one or more of the SWC 130 and/or HWC 140. In other embodiments, operations may be performed by different entities than those illustrated or may be performed entirely in software or hardware. The process may begin at operation 610, where the host OS 120 may draw host OS 120 drawing data to one or more host OS 120 drawing buffers (not illustrated). Next, at operation 620, the SWC may composite the host OS 120 drawing buffers at the frame buffer 360, as discussed above. Next at operation 630, the guest application 150 may draw frame data to the drawing buffer 210 as if it were a VGA buffer that was local to the guest application 150. Next, at operation 640, the HWC 140 may composite the frame data from the drawing buffer 120 with the data from the frame buffer 360 into the display buffer 350. Next, at operation 650, the contents of the display buffer 350 may be rendered on the display 110 of the computing device 105. The process may then repeat at operation 310 as the host OS 120 and the guest application 150 continue to generate new frames of graphical data. It may be recognized that, while particular techniques for rendering guest application 150 frame data and host OS 120 drawing data are illustrated, in other embodiments, other rendering techniques may be utilized.

Figure 7:
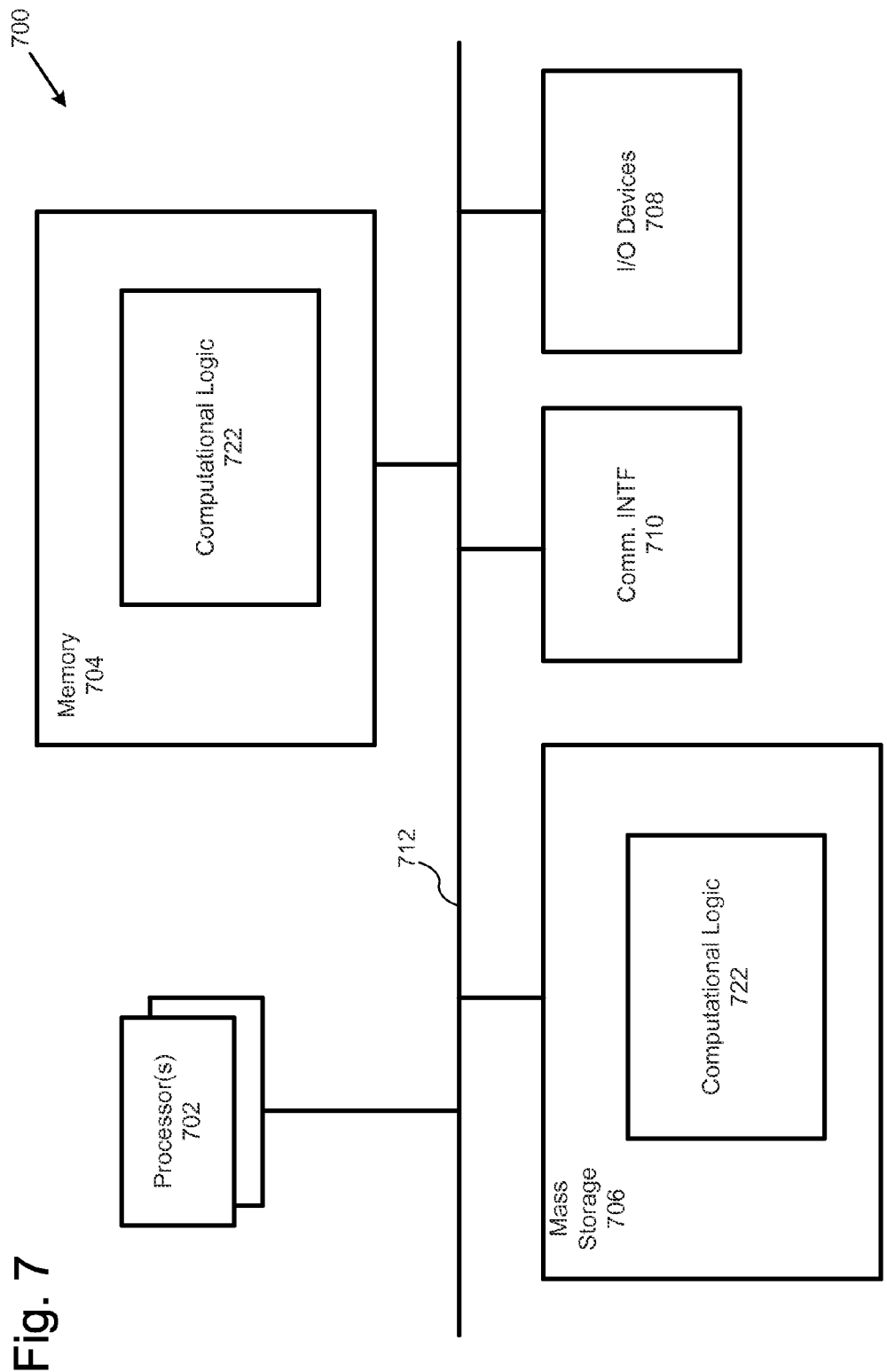
FIG. 7 illustrates an example computing environment suitable for practicing various aspects of the present disclosure in accordance with various embodiments.

Referring now to FIG. 7, an example computer suitable for practicing various aspects of the present disclosure, including processes of FIGS. 4-6, is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth, WiFi, Near Field Communications, Radio-frequency identification, and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing one or more of the modules shown in FIGS. 1-3, and/or the operations associated with techniques shown in FIGS. 4-6, collectively referred to as computing logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 710-712 may vary. Their constitutions are otherwise known, and accordingly will not be further described.

Figure 8:
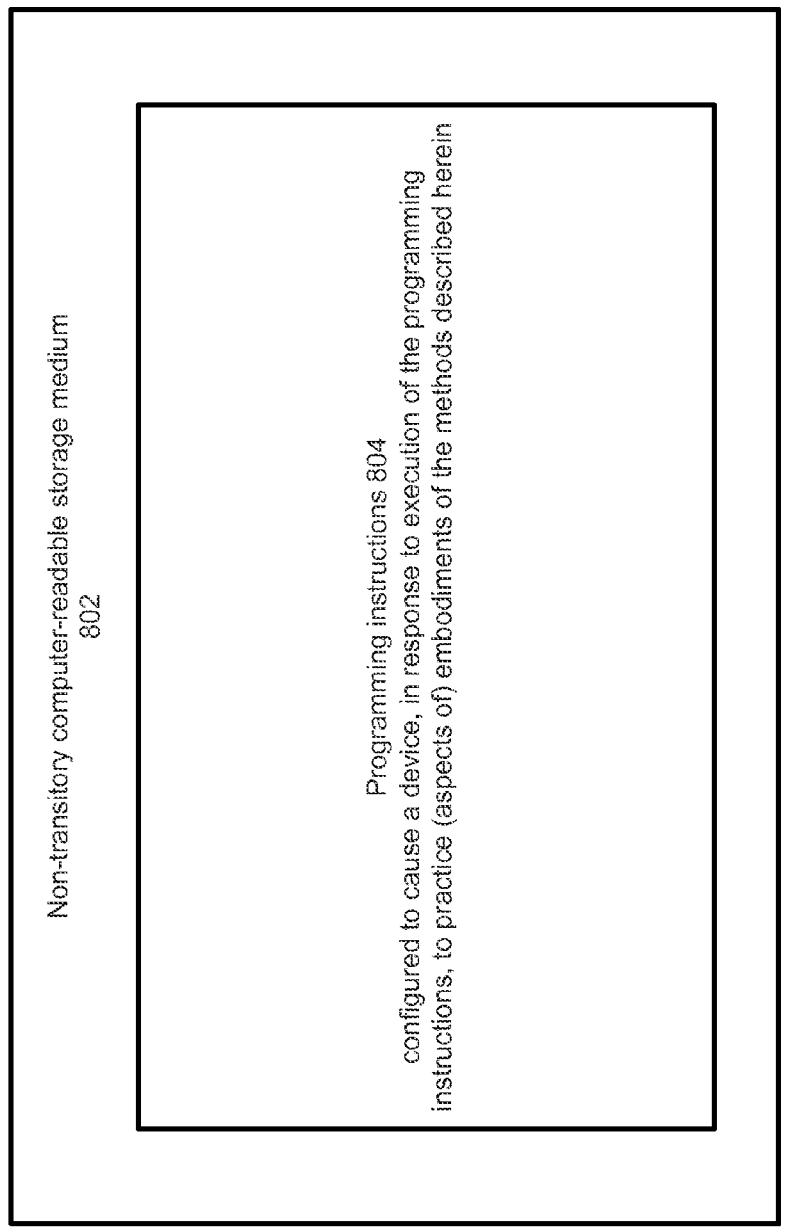
FIG. 8 illustrates an example storage medium with instructions configured to enable an apparatus to practice various aspects of the present disclosure in accordance with various embodiments.

FIG. 8 illustrates an example least one computer-readable storage medium 802 having instructions configured to practice all or selected ones of the operations associated with the techniques earlier described, in accordance with various embodiments. As illustrated, least one computer-readable storage medium 802 may include a number of programming instructions 804. Programming instructions 804 may be configured to enable a device, e.g., computer 700, in response to execution of the programming instructions, to perform, e.g., various operations of processes of FIGS. 4-6, e.g., but not limited to, to the various operations performed to perform facilitation of drawing of guest application frame data. In alternate embodiments, programming instructions

804 may be disposed on multiple least one computer-readable storage media 802 instead.

Referring back to FIG. 7, for one embodiment, at least one of processors 702 may be packaged together with computational logic 722 configured to practice aspects of processes of FIGS. 4-6. For one embodiment, at least one of processors 702 may be packaged together with computational logic 722 configured to practice aspects of processes of FIGS. 4-6 to form a System in Package (SiP). For one embodiment, at least one of processors 702 may be integrated on the same die with computational logic 722 configured to practice aspects of processes of FIGS. 4-6. For one embodiment, at least one of processors 702 may be packaged together with computational logic 722 configured to practice aspects of processes of FIGS. 4-6 to form a System on Chip (SoC). For at least one embodiment, the SoC may be utilized in, e.g., but not limited to, a computing tablet. (e.g., WiFi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 includes an apparatus to facilitate display of a guest application running in a guest operating system. The apparatus includes: one or more computing processors; a host operating system to be operated on the computing processors and a buffer provision application, to be operated within the host operating system. The buffer provision application is to cause allocation of a drawing buffer within the host operating system for use by the guest application and provide the drawing buffer for use by the guest application to draw one or more user interface elements.

Example 2 includes the apparatus of example 1, further including an emulator to be operated by the one or more processors to facilitate execution of the guest application within the host operating system.

Example 3 includes the apparatus of example 2, wherein the buffer provision application to provide the drawing buffer to the emulator.

Example 4 includes the apparatus of example 3, wherein the emulator is further to provide the drawing buffer to the guest application as a buffer in an execution in the guest operating system.

Example 5 includes the apparatus of any of examples 1-4, wherein the buffer provision application to provide a reference to the drawing buffer.

Example 6 includes the apparatus of any of examples 1-4, wherein the buffer provision application to provide a drawing buffer that can be directly written into by the guest application.

Example 7 includes the apparatus of any of examples 1-4, wherein the buffer provision application to dequeue the drawing buffer from a buffer queue, the drawing buffer being available to the buffer provision application.

Example 8 includes the apparatus of example 7, wherein the buffer provision application is further to enqueue the drawing buffer to the buffer queue after provision of the drawing buffer to the guest application.

Example 9 includes the apparatus of any of examples 1-4, wherein the host operating system is the Android operating system.

Example 10 includes the apparatus of example 9, wherein the guest operating system is a Windows operating system.

Example 11 includes a method for facilitating display of a guest application running in a guest operating system. The method includes causing, by a buffer provision application of a computing device, allocation of a drawing buffer within a host operating system for use by a guest application and providing, by the buffer provision application, the drawing buffer for use by the guest application to draw one or more user interface elements.

Example 12 includes the method of example 11, further including facilitating, by an emulator of the computing device, execution of the guest application within the host operating system.

Example 13 includes the method of example 12, wherein providing the drawing buffer includes providing the drawing buffer to the emulator.

Example 14 includes the method of example 13, wherein providing the drawing buffer includes the emulator providing the drawing buffer to the guest application as a buffer in an execution in the guest operating system.

Example 15 includes the method of any of examples 11-14, wherein providing the drawing buffer includes providing a reference to the drawing buffer.

Example 16 includes the method of any of examples 11-14, wherein providing the drawing buffer includes providing the drawing buffer to be directly written into by the guest application.

Example 17 includes the method of any of examples 11-14, wherein causing allocation of the drawing buffer includes dequeuing a drawing buffer from a buffer queue available to the buffer provision application.

Example 18 includes the method of example 17, further including enqueuing, by the buffer provision application or an emulator service of the computing device, the drawing buffer to the buffer queue after provision of the drawing buffer to the guest application.

Example 19 includes the method of any of examples 11-14, wherein the host operating system is the Android operating system.

Example 20 includes the method of example 19, wherein the guest operating system is a Windows operating system.

Example 21 includes one or more computer-readable media containing instructions written thereon for facilitating display of a guest application running in a guest operating system. The instructions are to, in response to execution on a computing device, cause the computing device to cause allocation of a drawing buffer within a host operating system for use by a guest application and provide the drawing buffer for use by the guest application to draw one or more user interface elements.

Example 22 includes the computer-readable media of example 21, wherein the instructions are further to cause the computing device to facilitate execution of the guest application within the host operating system using an emulator.

Example 23 includes the computer-readable media of example 22, wherein provide the drawing buffer includes provide the drawing buffer to the emulator.

Example 24 includes the computer-readable media of example 23, wherein provide the drawing buffer includes the provide, using the emulator, the drawing buffer to the guest application as a buffer in an execution in the guest operating system.

Example 25 includes the computer-readable media of any of examples 21-24, wherein provide the drawing buffer includes provide a reference to the drawing buffer.

Example 26 includes the computer-readable media of any of examples 21-24, wherein provide the drawing buffer includes provide the drawing buffer to be directly written into by the guest application.

Example 27 includes the computer-readable media of any of examples 21-24, wherein cause allocation of the drawing buffer includes dequeue a drawing buffer from a buffer queue.

Example 28 includes the computer-readable media of example 27, wherein the instructions are further to cause the computing device to enqueue the drawing buffer to the buffer queue after provision of the drawing buffer to the guest application.

Example 29 includes the computer-readable media of any of examples 21-24, wherein the host operating system is the Android operating system.

Example 30 includes the computer-readable media of example 29, wherein the guest operating system is a Windows operating system.

Example 31 includes an apparatus to facilitate display of a guest application running in a guest operating system. The apparatus includes means for causing allocation of a drawing buffer within a host operating system for use by a guest application and means for providing the drawing buffer for use by the guest application to draw one or more user interface elements.

Example 32 includes the apparatus of example 31, further including means for facilitating execution of the guest application within the host operating system.

Example 33 includes the apparatus of example 32, wherein means for providing the drawing buffer includes means for providing the drawing buffer to the emulator.

Example 34 includes the apparatus of example 33, wherein means for providing the drawing buffer includes means for providing the drawing buffer to the guest application as a buffer in an execution in the guest operating system.

Example 35 includes the apparatus of any of examples 31-34, wherein means for providing the drawing buffer includes means for providing a reference to the drawing buffer.

Example 36 includes the apparatus of any of examples 31-34, wherein means for providing the drawing buffer includes means for providing the drawing buffer to be directly written into by the guest application.

Example 37 includes the apparatus of any of examples 31-34, wherein means for causing allocation of the drawing buffer includes means for dequeuing a drawing buffer from a buffer queue.

Example 38 includes the apparatus of example 37, further including means for enqueuing the drawing buffer to the buffer queue after provision of the drawing buffer to the guest application.

Example 39 includes the apparatus of any of examples 31-34, wherein the host operating system is the Android operating system.

Example 40 includes the apparatus of example 39, wherein the guest operating system is a Windows operating system.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus to facilitate display of a guest application running in a guest operating system, the apparatus comprising:
    one or more computing processors;
    an emulator to be operated by the one or more processors to facilitate execution of a guest application in a guest operating system within a host operating system, wherein the guest application is non-native to the host operating system;
    the host operating system to be operated on the one or more computing processors;
    a buffer provision application, to be operated within the host operating system, to:
        cause allocation of a drawing buffer within the host operating system for use by the guest application;
        provide the drawing buffer to the emulator for use by the guest application to draw frame data associated with one or more user interface elements directly into the drawing buffer; and
        provide the host operating system with access to the drawing buffer to combine the frame data with other drawing data of the host operating system for composite display.

2. The apparatus of claim 1, wherein the emulator is further to provide the drawing buffer to the guest application as a buffer during the execution of the quest application in the guest operating system.

3. The apparatus of claim 1, wherein the buffer provision application is to provide a reference to the drawing buffer.

4. The apparatus of claim 1, wherein the buffer provision application is to provide the drawing buffer that can be directly written into by the guest application.

5. The apparatus of claim 1, wherein the buffer provision application is to dequeue the drawing buffer from a buffer queue, the drawing buffer being available to the buffer provision application.

6. The apparatus of claim 5, wherein the buffer provision application is further to enqueue the drawing buffer to the buffer queue after provision of the drawing buffer to the guest application.

7. The apparatus of claim 1, wherein the host operating system is an Android operating system.

8. The apparatus of claim 7, wherein the guest operating system is a Windows operating system.

9. A method for facilitating display of a guest application running in a guest operating system, the method comprising:
    facilitating, by an emulator of a computing device, execution of a guest application in a guest operating system within a host operating system, wherein the guest application is non-native to the host operating system;

causing, by a buffer provision application of the computing device, allocation of a drawing buffer within the host operating system for use by the guest application;

providing, by the buffer provision application, the drawing buffer to the emulator for use by the guest application to draw frame data associated with one or more user interface elements directly into the drawing buffer; and providing, by the buffer provision application, the host operating system with access to the drawing buffer to combine the frame data with other drawing data of the host operating system for composite display.

10. The method of claim 9, wherein providing the drawing buffer comprises the emulator providing the drawing buffer to the guest application as a buffer during the execution of the quest application in the guest operating system.

11. The method of claim 9, wherein providing the drawing buffer comprises providing a reference to the drawing buffer.

12. The method of claim 9, wherein providing the drawing buffer comprises providing the drawing buffer to be directly written into by the guest application.

13. The method of claim 9, wherein causing allocation of the drawing buffer comprises dequeuing a drawing buffer from a buffer queue available to the buffer provision application.

14. One or more non-transitory computer-readable media containing instructions written thereon for facilitating display of a guest application running in a guest operating system, the instructions to, in response to execution on a computing device, cause the computing device to:

facilitate execution of a guest application in a guest operating system within a host operating system using an emulator, wherein the guest application is non-native to the host operating system;

cause allocation of a drawing buffer within the host operating system for use by the guest application;

provide the drawing buffer to the emulator for use by the guest application to draw frame data associated with one or more user interface elements directly into the drawing buffer; and provide the host operating system with access to the drawing buffer to combine the frame data with other drawing data of the host operating system for composite display.

15. The non-transitory computer-readable media of claim 14, wherein provide the drawing buffer comprises provide, using the emulator, the drawing buffer to the guest application as a buffer during the execution of the quest application in the guest operating system.

16. The non-transitory computer-readable media of claim 14, wherein provide the drawing buffer comprises provide a reference to the drawing buffer.

17. The non-transitory computer-readable media of claim 14, wherein provide the drawing buffer comprises provide the drawing buffer to be directly written into by the guest application.

18. The non-transitory computer-readable media of claim 14, wherein cause allocation of the drawing buffer comprises dequeue a drawing buffer from a buffer queue.

19. The non-transitory computer-readable media of claim 18, wherein the instructions are further to cause the computing device to enqueue the drawing buffer to the buffer queue after provision of the drawing buffer to the guest application.

* * * * *

UNITED STATES PATENT AND TRADEMARK OFFICE
CERTIFICATE OF CORRECTION

PATENT NO. : 9,798,562 B2  
APPLICATION NO. : 14/778525  
DATED : October 24, 2017  
INVENTOR(S) : Jinkui Ren et al.

Page 1 of 1

It is certified that error appears in the above-identified patent and that said Letters Patent is hereby corrected as shown below:

In the Claims

Column 12  
Line 43, "...quest..." should read – ...guest... –

Column 13  
Line 17, "...quest..." should read – ...guest... –

Column 14  
Line 16, "...quest..." should read – ...guest... –

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*